United States Patent [19]

Melkonian et al.

[11] E Patent Number: Re. 31,817

[45] Reissued Date of Patent: Jan. 29, 1985

[54] RAISIN SEPARATING DEVICE

[76] Inventors: Douglas H. Melkonian; Mark S. Melkonian, both of 6058 E. Butler, Fresno, Calif. 93727; Dennis J. Melkonian, 8336 E. North Ave., Sanger, Calif. 93657; Suren M. Melkonian, 6058 E. Butler, Fresno, Calif. 93727

[21] Appl. No.: 484,547

[22] Filed: Apr. 13, 1983

Related U.S. Patent Documents

Reissue of:

[64] Patent No.: 4,267,930
Issued: May 19, 1981
Appl. No.: 15,936
Filed: Feb. 28, 1979

[51] Int. Cl.[3] ..... B07C 5/02

[52] U.S. Cl. ..... 209/3.1; 209/637; 209/640; 209/692; 209/699; 209/700

[58] Field of Search ..... 209/3.1-3.3, 209/637, 640, 691, 692, 693, 694, 695, 699, 700; 15/3.1, 3.11

[56] References Cited

U.S. PATENT DOCUMENTS

| | | | |
|---|---|---|---|
| 1,323,877 | 12/1919 | Lee et al. | 209/693 |
| 2,257,470 | 9/1941 | Marchant | 209/693 |
| 2,966,988 | 1/1961 | Nury et al. | 209/3.3 |
| 3,330,410 | 7/1967 | Kirk | 209/692 |
| 3,587,857 | 6/1971 | Reznik | 209/640 |
| 3,680,694 | 1/1972 | Hamann | 209/637 |
| 4,141,450 | 2/1979 | Clin et al. | 209/637 |
| 4,162,011 | 7/1979 | Beach | 209/637 |
| 4,204,291 | 5/1980 | Chooljian et al. | 209/506 |

OTHER PUBLICATIONS

Cox, Wayne, *The Fresno Bee,* p. G3, Feb. 4, 1979.

*Primary Examiner*—Robert B. Reeves
*Assistant Examiner*—Donald T. Hajec
*Attorney, Agent, or Firm*—Knobbe, Martens, Olson & Bear

[57] ABSTRACT

A batch of raisins in which moldy raisins are mixed with sound ones is immersed in a hot water bath, causing the moldy raisins to assume a mushy and sticky texture while leaving the texture of the sound raisins substantially unaffected. The batch of raisins is then dropped onto a laterally inclined conveyor belt. The conveyor belt moves the raisins over a framework which is rapidly moved up and down to slap the underside of the belt, causing the raisins to bounce up and down on the continuously moving conveyor. The sound raisins, which have retained their firm texture, are bounced substantially higher than the moldy raisins, and thus, bounce down off the side of the conveyor as they move along the length of the conveyor. Because of their mushy texture, the moldy raisins do not bounce as high as the sound ones and therefore do not as readily bounce downward off the conveyor. Instead, they are carried along and off the end of the conveyor. Moreover, when the mushy, moldy raisins land back on the conveyor, they stick to it, further preventing them from falling off the side. The moldy raisins are then washed off of the conveyor belt as the belt returns to receive more raisins.

18 Claims, 6 Drawing Figures

Fig. 1
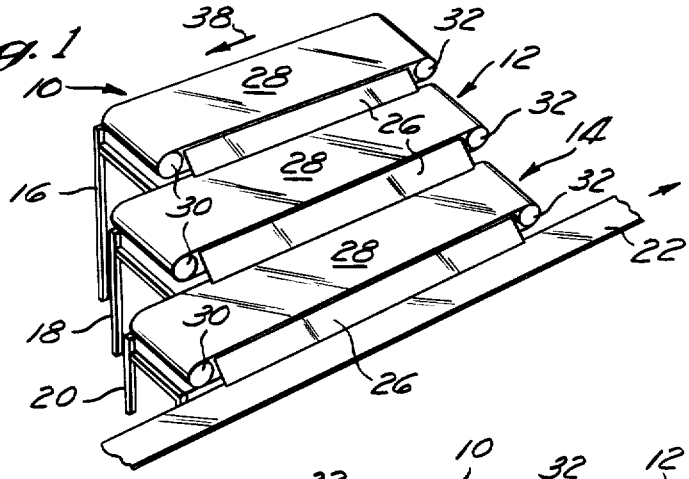
Fig. 2
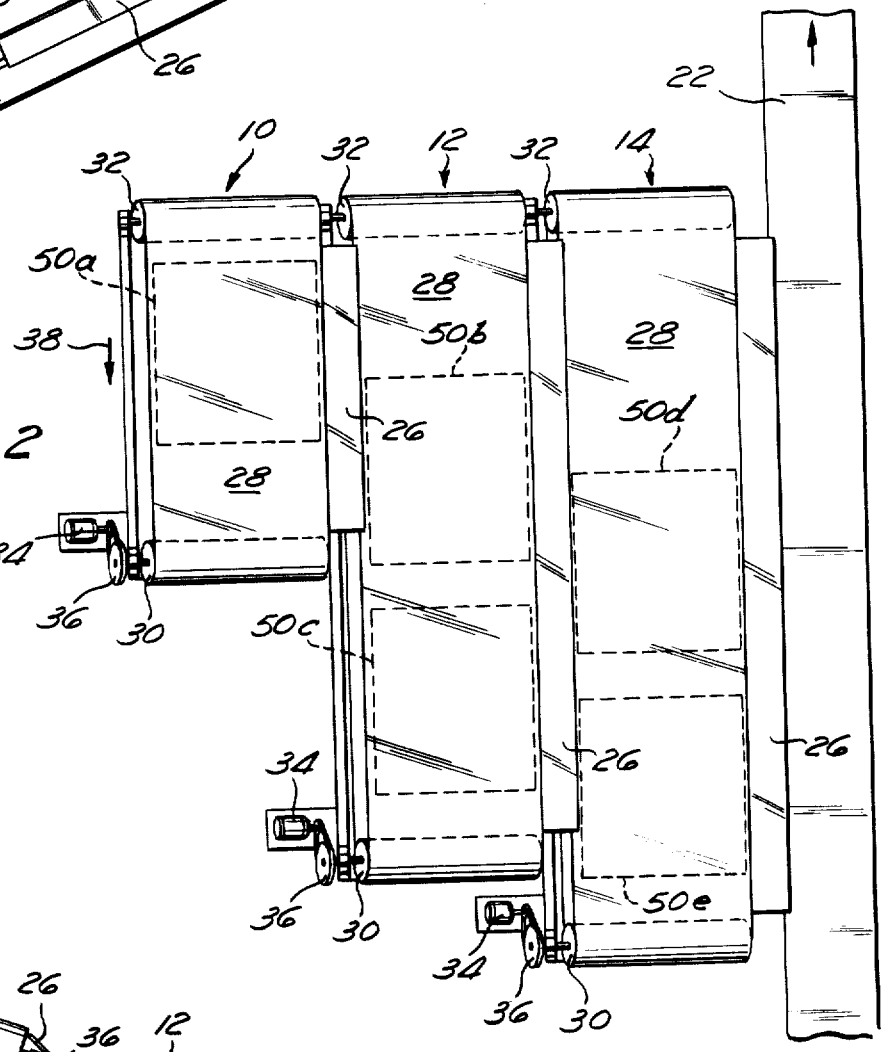
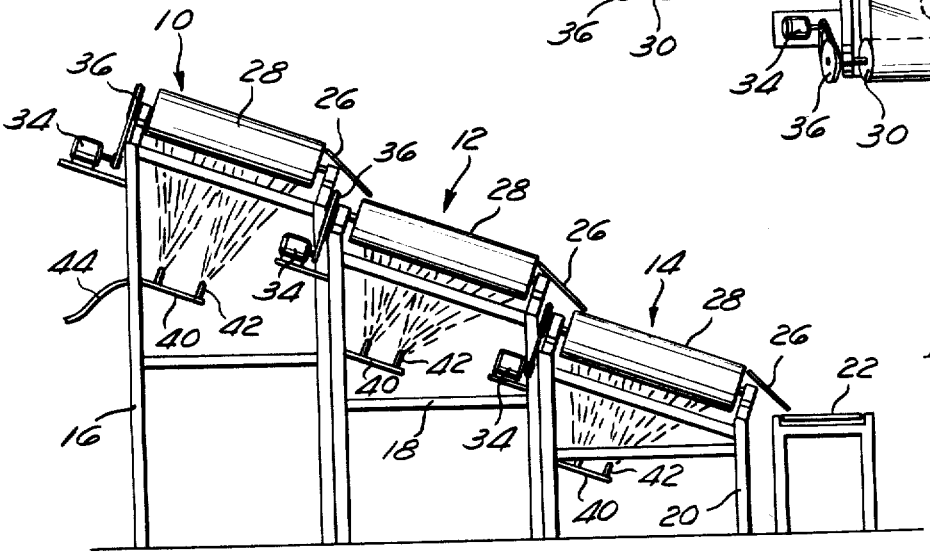
Fig. 3

RAISIN SEPARATING DEVICE

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for separating mold-damaged raisins from a batch of raisins in which the moldy raisins are thoroughly admixed with undamaged raisins.

Raisins are most commonly produced by laying bunches of grapes out where they are exposed to the sun. After a specified amount of time thus exposed, the grapes assume the dehydrated form in which they are known as raisins. However, if it rains while the grapes are undergoing the drying process, the resulting moisture promotes the growth of mold on the raisins, particularly those so positioned during the sun-drying process that the moisture can not evaporate quickly. Thus, in the event of rain during the raisin production process, the raisins which are brought in from the drying fields will include a substantial amount of moldy raisins mixed in with the undamaged raisins.

There are primarily two types of raisin mold. The first known as "black" mold, can be washed off of the raisins. The second, and more common type of mold is that known as "nodular" mold. Raisins affected by nodular mold cannot be readily reconditioned, and must be discarded.

To ensure that the raisins which ultimately reach the consumer are uniformly of a wholesome quality, the raisins which are damaged by nodular mold must be separated from the sound raisins prior to packaging. In some instances, this separation process comprises a visual inspection of the raisin batches after the raisins have been subjected to a hot water bath which causes the mold spots to turn white. This is followed by manual selection of the moldy raisins. This method yields adequate results only if there are relatively few bad raisins in a given batch.

In addition to turning white, the hot water bath makes these moldy raisins soft and sticky while leaving the good raisins unaffected and, therefore, hard. Several ,rior art mechanical sorters use that change in texture as a basis for the sorting. For example, in one device, an auger lifts the raisins from the hot water bath and squeezes the soft moldy raisins through a screen which forms the lower portion of the housing around the auger. The good raisins resist the squeezing and are carried along by the auger. That process is effective on those raisins in the outer portion of the auger conveyor, but the auger does not mix the raisins well so that a substantial portion of the bad raisins do not come adjacent to the screen.

Other mechanical devices to squeeze the soft, moldy raisins also have been used. In one, water pushes the soft raisins through holes in a metal surface over which the raisins travel. In another, rollers disposed over a conveyor pinch all of the raisins between the rollers and the conveyor. The moldy raisins tend to stick to the rollers while the good raisins do not. These devices are helpful, but are not sufficiently effective where the percentage of bad raisins is high.

A mechanical raisin sorting method disclosed in the patent art is U.S. Pat. No. 2,967,614 to Nury et al. In this method, the raisins are soaked in an aqueous solution of hydrogen peroxide which causes the moldy raisins to assume different optical qualities from the good raisins. The raisins are then dispensed individually onto a conveyor in a spaced relation in a single row. An optical scanner, which is sensitive to the optical differences between the moldy raisins and the sound raisins, scans the raisins individually as they pass by the scanner on the conveyor, and when a moldy raisin is encountered by the scanning device, a jet of air is caused to blow the moldy raisin off of the conveyor. It is evident that such a procedure is inconvenient and time consuming, and the requirement that the raisins be placed on the conveyor in a single row in a spaced relationship would necessitate a relatively complex mechanism.

In summary, the raisin industry has yet to find a totally satisfactory means for removing moldy raisins from the good raisins in the batches brought in from the drying fields. The need for such a method has been most acute where the proportion of nodular mold-damaged raisins to unspoiled raisins is relatively large. Consequently, where a large proportion of the raisins in a batch have been damaged by nodular mold, the common practice has been to discard the entire batch, resulting in much waste of good raisins.

SUMMARY OF THE INVENTION

The present invention, in its broadest sense is a method and apparatus for separating moldy raisins from unspoiled raisins by making use of the difference in texture between the good and the bad raisins which results from an immersion in hot water. Specifically, a batch of raisins from the drying fields is immersed in a tank or vat of hot water for a period of approximately 10 to 30 seconds. For best results, the water should be approximately 170° F. but it can range anywhere from approximately 150° F. to 190° F. This immersion gives the moldy raisins a soft and mushy texture while the unspoiled raisins remain relatively firm. The raisins are then removed from the hot water bath and loaded onto a conveyor belt which is laterally inclined or tipped about its longitudinal axis so as to present a downwardly sloping surface in a direction perpendicular to the direction of travel of the conveyor belt.

The belt of the conveyor is made of a resilient material having a roughly textured surface. The conveyor belt is in the form of an endless loop wrapped about a pair of spaced rollers. Thus configured, the belt has an upper portion which receives the raisins and carries them in a first direction and a lower portion which returns in the opposite direction to receive a new load of raisins. Located between the upper and lower portions is a frame-like member which is driven by a motor in a manner which causes it to slap against the underside of the upper portion of the belt as the belt conveys the raisins over the member. The frequency of this slapping action is controlled, as is the speed of conveyor travel. When the resilient belt is thus slapped by the frame member, the raisins are caused to bounce. Those raisins which are unspoiled and therefore remain firm after the hot water immersion bounce relatively high so that they bounce down and off of the belt in a few bounces and onto an adjacent conveyor to carry them on. The raisins which are spoiled by mold, on the other hand, do not bounce quite so high and therefore they progress more slowly down the belt and tend to be carried further along the moving belt in its direction of travel. Moreover, because of their softened texture, the spoiled raisins, upon landing, tend to become squashed against the belt, adhering to the roughly textured surface thereof. The squashed raisins are then carried along by the belt as it reverses direction around a roller and returns along its lower portion. As the raisins are carried along by the return portion of the belt, they are washed off of the belt by a water spray directed from nozzles located underneath the conveyor. Thus, a clean belt is presented in a position to receive a new load of raisins.

In experimental use, the present invention has achieved a totally satisfactory separation of moldy raisins from good raisins. Moreover, this separation has been accomplished quickly, efficiently and economically. Furthermore, the efficiency of the process increases with greater loads of raisins. This is due to the fact that the sheer weight of the raisins tends to squash the moldy raisins onto the conveyor belt.

Although satisfactory results have been achieved using a single conveyor having a single slapping mechanism, efficiency can be increased by utilizing a multi-stage process. In this multi-stage process, the raisins are first loaded onto a relatively slow moving, laterally inclined conveyor belt having a single slapping mechanism delivering a relatively high frequency slap. The raisins which bounce laterally off of the first conveyor are caught on a second laterally inclined conveyor which moves at a slightly higher speed than the first conveyor. The second conveyor conveys the raisins over a first slapping mechanism which has a slapping action of intermediate frequency, and then over a second slapping mechanism which delivers a relatively low frequency slap. If further sorting is still desired, the raisins which bounce laterally off of the second conveyor can be caught on a third conveyor which moves at even a faster speed. This third conveyor, like the second conveyor, sequentially conveys the raisins over a pair of slapping mechanisms, with the second slapping mechanism on the third conveyor delivering a lower frequency slap than the first slapping mechanism on the third conveyor. With this multi-stage process, the selection of the highest quality raisins is achieved with the utmost in efficiency and economy.

By achieving an efficient and economical separation of mold-damaged raisins from batches containing a high proportion of moldy raisins, the present invention allows the recovery of relatively large quantities of good raisins that would otherwise be discarded. The present invention thus minimizes waste in the raisin production process, thereby contributing to lower costs in the production of high quality raisins.

BRIEF DESCRIPTION OF THE DRAWINGS

FIG. 1 is a front perspective view of the apparatus used in the present invention;

FIG. 2 is a top plan view of the apparatus shown in FIG. 1;

FIG. 3 is a side elevation view taken from the left side of FIG. 1;

DETAILED DESCRIPTION OF THE INVENTION

Figure 4:
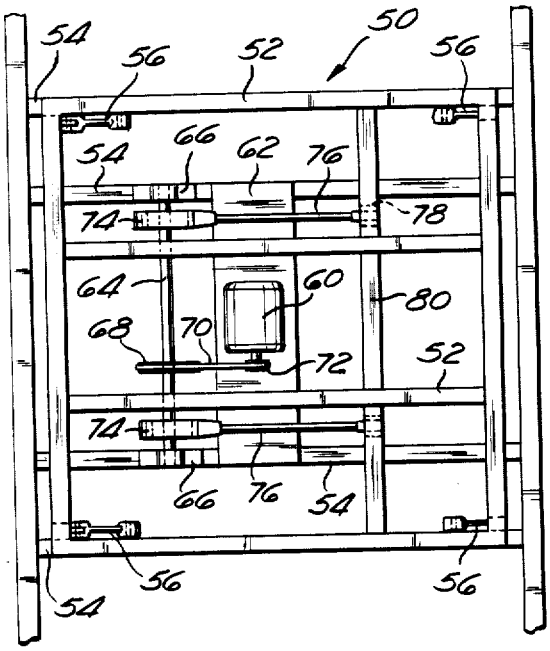
FIG. 4 is a top plan view of the vibrating or slapping mechanism used in the present invention.

Referring first to FIGS. 1, 2 and 3, the preferred embodiment of the invention is shown as comprising three adjacent, parallel raisin-separating conveyor mechanisms 10, 12 and 14. The first or uppermost separating conveyor 10 is supported on a relatively tall support structure 16; the middle conveyor 12 is supported on a somewhat shorter support structure 18; and the final conveyor 14 is supported on a still shorter support structure 20. In this manner, the first conveyor assembly 10 is supported at the greatest height of the three conveyors, and the final conveyor 14 is supported at the lowest height, with the middle conveyor 12 at an intermediate height.

As shown most clearly in FIG. 3, each of the separating conveyors 10, 12 and 14 is tipped with respect to its longitudinal axis so as to have a lateral inclination of approximately 15° from the horizontal. In this manner, a series of uniform downward slopes is presented from the top conveyor 10 to a receiving conveyor belt 22 which collects the raisins from the lowermost separating conveyor 14. Each of the separating conveyors 10, 12 and 14 has a downwardly sloping planar chute 26 extending along its lower edge.

Except for the fact that they are slanted downwardly in a direction perpendicular to their direction of travel, the separating conveyors 10, 12 and 14 resemble conventional conveyor mechanisms. Thus, each of the conveyors 10, 12 and 14 comprises a conveyor belt 28 in the form of a continuous loop wrapped around a driven roller 30 at one end and a slave roller 32 at the other end. The driven rollers 30 are each driven by an electric motor 34 through a pulley mechanism 36, although various other types of drive mechanisms may be used. This drive mechanism causes the upper portion of the belt 28 to travel in the direction indicated by the arrows designated by the numeral 38.

For reasons which will be presently made clear, the conveyor belts 28 are provided with a roughly textured upper surface. The belt should be made of a resilient, yet durable material, such as synthetic rubber or polyvinylchloride, with the roughly textured upper surface being provided by a fabric backing layer which is in turn coated with a thin layer of rubber, as is well known in the art. Satisfactory results have been obtained merely by turning a conventional conveyor belt upside-down so that the back surface (which has the rough texture of the fabric backing layer) provides the upper surface of the belt.

As shown in FIG. 3, each of the support structures 16, 18 and 20 is provided with a water spray assembly 40 having a plurality of water nozzles 42. The spray assemblies 40 are connected by a hose 44 to a water supply (not shown) and the nozzles 42 are configured so as to direct a strong spray of water against the undersides of the conveyors 10, 12 and 14 for purposes to be presently described.

Figure 5:
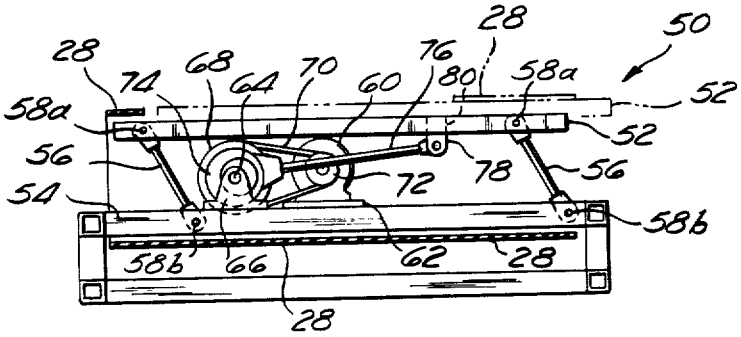
FIG. 5 is a side elevation view of the vibrating or slapping mechanism taken from the bottom of FIG. 4.

Turning now to FIGS. 4 and 5, a vibrating or slapping mechanism 50 used in the present invention is illustrated in detail. As indicated by the dotted square outlines in FIG. 2, the preferred embodiment of the invention uses five of the slapping mechanisms mounted in the conveyor support structures so as to be within the interiors of the loops formed by the conveyor belts 28.

As shown in FIG. 2, the upper conveyor 10 has a single slapping mechanism 50a; the middle conveyor 12 has two slapping mechanisms 50b and 50c; and the lower conveyor 14 also has two slapping mechanisms 50d and 50e.

Referring once again to FIGS. 4 and 5, the vibrating mechanism 50 comprises a belt slapping element 52 in the form of an open framework of square cross-sectional hollow metal tubular members. The slapping member 52 is pivotally supported on upper crossbar members 54 of the conveyor support structure by four pivoting hanger arms 56, one at each corner of the slapping element 52. Each of the hanger arms 56 is attached by a first pivot pin 58a to the slapping element 52 and by a second pivot pin 58b to the crossbar member 54. The linkage formed by the hanger arms 56 and pivot pins 58a and 58b allows the slapping element 52 to swing upwardly and to the right as shown in phantom outline in FIG. 5.

A variable speed electric motor 60 is mounted on a platform 62 which, in turn, is supported on the crossbar elements 54. A rotating shaft 64 is journaled in a pair of bearings 66 which are mounted on a pair of adjacent crossbar elements 54. The shaft 64 is provided with a sheave 68 which, in turn, is attached by a belt 70 to a pulley 72 mounted on the drive shaft of the motor 60.

The shaft 64 is also provided with a pair of eccentrics 74 mounted at opposite ends of the shaft 64 proximate the bearings 66. Extending from each of the eccentrics 74 is a connecting arm or shaft 76. Each of the connecting shafts 76 is pivotally attached by means of a connecting head 78 to a crossbar 80 made of square cross-sectional hollow metal tubing. The crossbar 80, in turn, is attached to opposite ends of the slapping or vibrating element 52 across the underside thereof.

The structure of the slapping or vibrating assembly 50 having been fully described, its manner of operation will now be easily understood. The shaft 64 is rotated at a constant speed by the motor 60 acting through the pulley 72, the belt 70 and the sheave 68. The rotation of the shaft 64 produces an eccentric rotation of the eccentrics 74 which, in turn, provides a reciprocation of the connecting arms 76. This reciprocation is transmitted to the slapping element 52 through the connecting head 78 and the crossbar 80. By means of the hanger arms 56, the motion of the slapping element 52 is directed upwardly and to the right as shown in phantom outline in FIG. 5 so as to strike sharply the undersurface of the forwardly traveling upper portion of the conveyor belt 28. The slapping or vibrating assembly 50 is preferably configured so that the slapping or vibrating element 52 has approximately one-half inch of vertical travel; however, this value is not critical and can be varied to a considerable extent. It is also desirable to select components for the slapping element actuation assembly which are of sizes and configurations to produce a slapping or vibrating frequency for the slapping element 52 of between approximately 200 to 400 slaps per minute, depending upon the speed of the variable speed motor 60. As will be seen, the various slapping assemblies used in the preferred embodiment of the invention are preferably run at different speeds to provide different slapping frequencies.

Having fully described the apparatus used in the present invention, the method of separating moldy raisins from unspoiled raisins using this apparatus can now be explained.

Raisins brought in from the drying fields are placed in a vat or tank of water which has been heated to a temperature of between 150° F. to 190° F. with approximately 170° F. being preferred. The raisins are immersed in this hot water bath for a sufficient amount of time to render nodular mold-damaged raisins soft and sticky in texture, without substantially affecting the texture of undamaged raisins. This time interval will depend on a variety of factors, the most important of which being the water temperature. With a water temperature of 170° F., best results have been obtained by immersing the raisins for a period of approximately 15 seconds.

Figure 6:
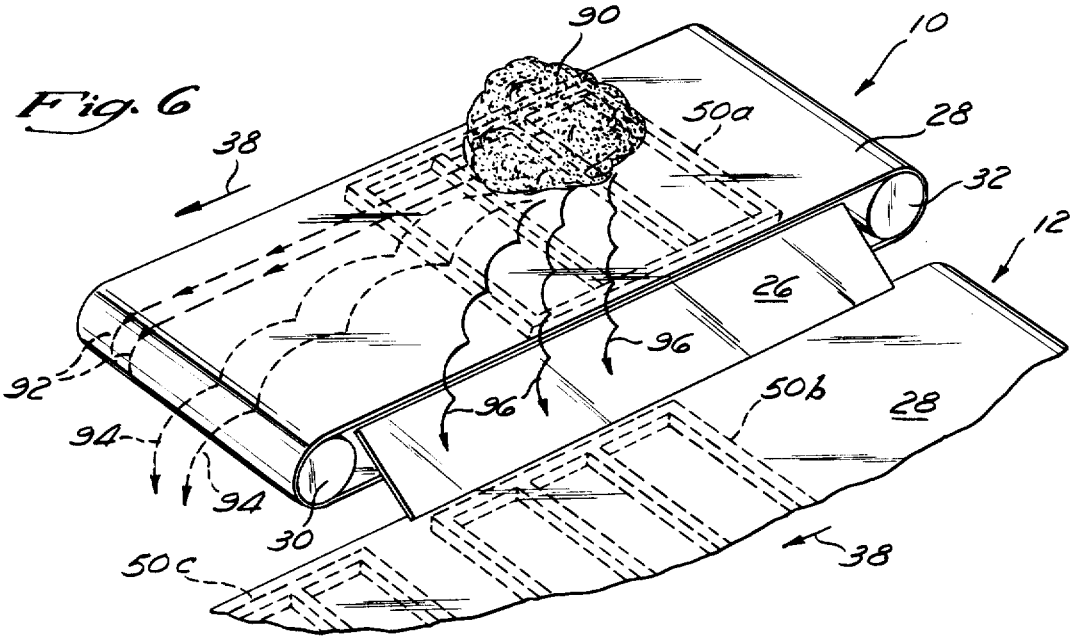
FIG. 6 is a perspective view of one of the conveyor belts used in the present invention showing the respective motions of spoiled and unspoiled raisins as a result of the action of the slapping mechanism.

From the hot water tank or vat, the mixed batch of moldy raisins (which are soft and sticky) and undamaged raisins (which are still firm in texture) is transported by conventional means, such as a conveyor or an auger, to the first conveyor 10, and is dumped thereon as indicated by the numeral 90 in FIG. 6.

The first conveyor 10 transports the raisins 90 at a relatively slow rate of speed, i.e., on the order of 3 to 10 feet per minute. The raisins are conveyed over the slapping or vibrating mechanism 50a as the vibrating member 52 is slapped against the underside of the belt 28, in the manner previously described, with a frequency of approximately 300 to 400 slaps per minute. The agitation and vibration of the belt 28 causes a bouncing of the raisins thereon. Since the softness of the raisins is roughly proportional to the degree of mold damage which they have suffered, those raisins which are most severely damaged by the mold will, because of their extreme softness and stickiness, tend to stick to the roughly textured surface of the belt 28, either by the weight of the raisins as they are dropped onto the conveyor, or as a result of being flattened against the belt after a few bounces. The severely spoiled raisins will be carried along on the belt as the belt rounds the end roller 30, as indicated by the dashed arrows 92 in FIG. 6. Those raisins which are somewhat less severely damaged by mold may bounce on the belt, but they will not bounce very high or very far because of their relatively soft texture, and because of their tendency to adhere to the belt. These raisins will be carried a considerable distance by the belt 28, and many of them will be carried to the end of the belt, dropping off of the belt as it rounds the roller 30, as shown by the dotted arrows 94 in FIG. 6.

Those raisins which are not damaged by mold or which have been damaged only a slight degree will, as previously mentioned, retain a relatively firm texture even after immersion in the hot water bath. Consequently, these raisins will tend to be bounced relatively high by the agitation of the belt 28, and, accordingly, they will bounce down off of the belt in a relatively few bounces, as shown by the wavey arrows 96 in FIG. 6. These relatively firm raisins will land on the inclined chute 26 so that they fall onto the middle conveyor 12.

The second or middle conveyor 12 is advantageously used to effect a finer degree of sorting of the raisins, since some mold-damaged raisins will be bounced off of the first conveyor 10, due to the relatively slow conveyor belt speed of the first conveyor coupled with the relatively high frequency of the slapping action. Accordingly, the belt of the middle conveyor 12 is moved at a somewhat greater speed than that of the first conveyor 10, transporting the raisins landing thereon over a first slapping mechanism 50b, which is run at a somewhat slower slapping frequency than that of the mechanism 50a in the first conveyor. Those raisins which are not bounced off of the second conveyor 12 by the action of its first slapping mechanism 50b are transported over a second slapping mechanism 50c which is operated at a somewhat slower slapping frequency than is the slapping mechanism 50b.

Those raisins which are bounced off of the side of the second conveyor 12 are advantageously caught on the third conveyor 14 for final sorting. The belt 28 on the third conveyor 14 is moved at a relatively high rate of speed, preferably between 20 and 30 feet per minute. This conveyor 14 conveys the remaining raisins sequentially over a pair of slapping mechanisms 50d and 50e. The first slapping mechanism 50d on the third conveyor 14 is operated preferably at an intermediate slapping frequency (approximately 250 to 350 slaps per minute) while the final slapping mechanism is operated at a relatively low frequency, preferably about 200 to 250 slaps per minute. As a result of this multi-stage separating process, during which the raisins are subjected to as many as five bouncing or vibrating stages, the raisins which are bounced off of the final conveyor 14 are uniformly those which are of the highest quality and which are undamaged to any significant degree by the nodular mold. These raisins bounce down the final chute 26 onto the receiving belt 22.

As previously mentioned, the motors 60 which drive the slapping mechanisms 50 are of the variable speed type. Likewise, the motors 34 which drive the conveyor belts should likewise be of the variable speed type. Using variable speed motors allows the adjustment of the speeds of each of the conveyors 10, 12 and 14 as well as the slapping frequencies of each of the slapping mechanisms 50a through 50e. Thus, the raisin separating process can be closely monitored, and the various slapping frequencies and conveyor belt speeds adjusted if it is seen, for example, that moldy raisins are being bounced onto the receiving belt 22, or that undamaged raisins are being dropped off of the ends of the conveyors as the belts 28 travel around the end rollers 30. The slapping frequencies and the conveyor belt speeds may also be adjusted to accommodate varying loads of raisins.

Referring once again to FIG. 3, the final stage in the process is shown. In order to avoid a build-up of sticky, mold-damaged raisins on the belts 28, the belts are washed by water sprays from the nozzles 42 as the belts travel in a reverse direction along the underside of the conveyors. The use of water sprays to clean the belts 28 is preferred because of the economy and simplicity of this method. However, other belt cleaning means may be used, such as, for example, brushes or scrapers. The added complexity of such other cleaning mechanisms would be compensated, to some extent, by the fact that the belts would be left somewhat stickier than they would be if they are washed by the water spray, thereby somewhat increasing the efficiency of the raisin separating process. Whatever means is used for cleaning the belts, a clean section of belt should be presented in the position to receive more raisins.

In addition to achieving an efficient separation of moldy raisins from the unspoiled raisins, the present invention has been found to achieve an additional benefit in the processing of raisins. Specifically, while the raisins are dried in the drying fields, they become mixed with a certain amount of sand which becomes embedded in the wrinkles in the skins of the raisins. Consequently, the raisins must be subjected to a thorough washing to remove this sand. The present invention, in subjecting the raisins to a vigorous agitation, tends to shake the sand loose from within the wrinkles, making the washing process substantially easier and more effective.

What is claimed is:

1. A method for separating moldy raisins from a mixed batch of moldy raisins and unspoiled raisins, comprising the steps of:

immersing said mixed batch of raisins in hot water for a sufficient amount of time to make the moldy raisins substantially softer than the unspoiled raisins;

loading said mixed batch of raisins in a bulk mass onto a resilient moving conveyor, inclined transversely to its direction of movement;

striking said conveyor with a predetermined frequency to cause the firmer raisins to bounce progressively off the side of said conveyor in a series of bounces while the softer raisins move more in the direction of movement of the conveyor; and removing said softer raisins from said surface.

2. The method of claim 1, wherein said hot water has a temperature between approximately 150° F. and 190° F.

3. The method of claim 1, wherein the step of removing said softer raisins from said surface further comprises:

spraying fluid against said surface.

4. The method of claim 1, further comprising the steps of:

monitoring the striking of said surface to determine the relative proportions of raisins which bounce off said surface and remain on said surface; and adjusting said predetermined frequency to very said relative proportions.

5. The method of claim 1, further comprising the steps of:

receiving said raisins which bounce off of said surface;

loading said received raisins onto a second moving conveyor also inclined transversely to its direction of movement; and repeating said steps of striking said surface and removing said softer raisins.

6. A method for separating moldy raisins from a mixed batch of moldy raisins and unspoiled raisins, comprising the steps of:

immersing said mixed batch of raisins in water of approximately 150° F. and 190° F. for an amount of time sufficient to make the moldy raisins substantially softer than the unspoiled raisins;

loading said mixed batch of raisins in a bulk mass onto a laterally inclined conveyor belt;

striking said conveyor belt, as said raisins are carried thereon, with a predetermined frequency to cause the firmer raisins to progressively bounce off the side of said belt in a series of small bounces, while allowing the softer raisins to remain on said belt; and removing the softer raisins from said belt as said belt returns to a position to receive the next mixed batch of raisins.

7. The method of claim 6, wherein said striking step further comprises:

striking the underside of said conveyor belt by a motor-driven, open-framework element.

8. The method of claim 6, further comprising the steps of:

monitoring the striking of said belt to determine the relative proportions of raisins which are bounced off of said belt and remain on said belt; and adjusting said predetermined frequency to vary said relative proportions.

9. The method of claim 6, further comprising the steps of:

receiving said raisins which bounced off of said belt onto a second inclined conveyor belt, some of said received raisins being firmer than the other received raisins;

striking said second belt with a predetermined frequency to cause the firmer raisins to bounce off of said second belt, while allowing the softer raisins to remain on said second belt; and removing the softer raisins from said second belt as said second belt returns to a position to receive more raisins.

10. The method of claim 9, wherein said striking of said second belt is done at a second predetermined frequency different from the predetermined frequency at which the first belt is struck.

11. The method of claim 9, wherein said striking step further comprises the steps of:

striking said second belt at a first location with a first predetermined frequency; and striking said second belt at a second location with a second predetermined frequency.

12. Apparatus for separating moldy raisins from unspoiled raisins in a mixed batch of raisins, after the moldy raisins have been made substantially softer than the unspoiled raisins by immersion of said batch in hot water, said apparatus comprising:

a conveyor belt for receiving and transporting said mixed batch of raisins in a bulk mass in a first direction, said belt being inclined in a second direction perpendicular to said first direction;

means for periodically slapping said conveyor belt with a predetermined frequency to cause the firmer raisins to bounce progressively off the side of said belt in a series of bounces while allowing the softer raisins to remain on said belt; and means for removing the softer raisins from said belt as said belt returns to a position to receive the next batch of raisins.

13. The apparatus of claim 12, wherein said conveyor belt is a first conveyor belt, and further comprising:

a second inclined conveyor belt positioned to receive the raisins which bounce off said first conveyor belt, some of said received raisins being firmer than the others;

means for striking said second belt with a predetermined frequency to cause said firmer raisins to bounce off of said second belt while allowing the softer raisins to remain on said second belt; and means for removing said softer raisins from said second belt.

14. The apparatus of claim 13, wherein said means for striking said second belt comprises:

first striking means for striking said second belt at a first location with a first predetermined frequency; and second striking means for striking said second belt at a second location with a second predetermined frequency.

*15. A method for separating moldy raisins from a mixed batch of moldy raisins and unspoiled raisins, comprising the steps of:*

*immersing said mixed batch of raisins and unspoiled raisins, a sufficient amount of time to make the moldy raisins substantially softer than the unspoiled raisins;*

*loading said mixed batch of raisins in a bulk mass onto a surface of an inclined, resilient moving conveyor, said conveyor having an upper portion and a lower portion;*

*agitating said conveyor at a predetermined frequency whereby the difference in resilience of the moldy raisins and unspoiled raisins will cause the firmer unspoiled raisins to bounce progressively off the lower portion of the inclined conveyor in a series of bounces while the softer moldy raisins move in the direction of movement of the conveyor; and*

*removing said softer raisins from said surface.*

*16. The method of claim 15 further comprising the steps of receiving said raisins which bounce off of said surface;*

*loading said received raisins onto a second moving conveyor also inclined relative to its direction of movement; and*

*repeating said steps of agitating said conveyor and removing said softer raisins.*

*17. A method for separating moldy raisins from a batch of moldy raisins and unspoiled raisins comprising the steps of:*

*immersing said mixed batch of raisins in water of between approximately* 150° F. and 190° F. for an amount of time sufficient to make the moldy raisins substantially softer than the unspoiled raisins;

*loading said mixed batch of raisins onto the surface of an inclined moving conveyor belt, said conveyor belt having an upper portion and a lower portion;*

*striking said conveyor belt, as said raisins are carried thereon, at a predetermined frequency whereby the difference in resiliency of the moldy and unspoiled raisins will cause the firmer raisins to progressively bounce off the lower portion of the inclined conveyor in a series of small bounces, while allowing the softer raisins to remain on said belt; and*

*removing the softer raisins from said belt as said belt returns to a position to receive the next mixed batch of raisins.*

*18. Apparatus for separating moldy raisins from unspoiled raisins in a mixed batch of raisins, after the moldy raisins have been made substantially softer than the unspoiled raisins by immersion of said batch in hot water, said apparatus comprising;*

*a conveyor belt for transporting said mixed batch of raisins in a first direction, said first direction including a horizontal component, said belt being incined in a second direction relative to said horizontal component of said first direction, said belt having an upper portion and a lower portion;*

*means for periodically slapping said conveyor belt with a predetermined frequency whereby the difference in resilience of the moldy raisins and unspoiled raisins will cause the firmer raisins to bounce progressively off the lower portion of the inclined conveyor in a series of bounces while allowing the softer raisins to move in said first direction; and*

*means for removing the softer raisins as said conveyor returns to a position to receive the next batch of raisins.*

* * * * *